United States Patent [19]
Falk et al.

[11] Patent Number: 5,757,157
[45] Date of Patent: May 26, 1998

[54] SENSOR MOUNT APPARATUS

[75] Inventors: Joseph S. Falk, Reistertown; Anthony J. Euler, Ellicott City, both of Md.

[73] Assignee: TCOM, L.P., Columbia, Md.

[21] Appl. No.: 559,059

[22] Filed: Nov. 16, 1995

[51] Int. Cl.$^6$ .................................................... G05B 11/01
[52] U.S. Cl. .......................... 318/560; 244/115; 244/116; 244/31; 244/33; 244/96; 244/97
[58] Field of Search ................................. 244/115, 116, 244/31, 33, 96, 97, 99; 318/560

[56] References Cited

U.S. PATENT DOCUMENTS

| | | | |
|---|---|---|---|
| 4,112,753 | 9/1978 | Calli | 244/33 X |
| 4,402,479 | 9/1983 | Phipps, III et al. | 244/33 X |
| 5,449,130 | 9/1995 | Huntington | 244/33 X |

OTHER PUBLICATIONS

Boresi et al., "Advanced Mechanics of Materials", Statically Indeterminate Curved Beams, pp. 389–392, (1985).

*Primary Examiner*—Karen Masih
*Attorney, Agent, or Firm*—Foley & Lardner

[57] ABSTRACT

A sensor mount apparatus includes a loop for carrying a sensor payload. An upper portion of the loop includes at least one upper attachment point for receiving at least one upper tether line. A lower portion of the loop includes at least one lower attachment point to connect the sensor mount apparatus to a lower tether line. The sensor mount apparatus further includes an upper plate mounted to the loop, a lower plate for carrying a sensor payload, and a slide mechanism mounted between the two plates. The slide mechanism operates to slidably move the lower plate relative to the upper plate so that the lower plate and sensor payload attached to the lower plate move to a position where the sensing device of the sensor payload is not obstructed by the loop. Where the sensor payload is an optical sensor, such as a camera, the camera may be positioned to see an unobstructed, three hundred sixty degree field of view. A free mount arrangement between the upper plate and the loop reduces sensor performance degradation when the loop is under stress.

20 Claims, 6 Drawing Sheets

SENSOR MOUNT APPARATUS

BACKGROUND OF THE INVENTION

1. Field of the Invention

This invention relates to a sensor mount apparatus for mounting a sensor payload in an airborne position. More specifically, this invention relates to a sensor mount apparatus for mounting an optical sensor to a tethered aerostat flight vehicle to obtain an above-ground, unobstructed, three hundred sixty degree field of view.

2. Related Art

Aerostat flight vehicles have been used in the past for providing aerial surveillance and communications coverage. The aerostats are flown at high altitudes and serve as stable platforms for a variety of payloads, including those designed for radar surveillance, electronic surveillance, optical/infrared surveillance, and communications. The aerial advantage of the aerostat allows the aerostat-payload system to survey a wider area than ground-based systems. For example, aerostat surveillance systems can detect targets undetectable from the ground due to horizon limitations and terrain obstructions.

Along with the success of these prior aerostat-payload systems, it became desirable to design an aerostat platform system for optical and other sensors requiring a three hundred sixty degree field of view. Mounting such a sensor directly to an aerostat does not achieve optimal sensor coverage, since the aerostat's hull structure blocks the sensor optics. Mounting such a sensor indirectly to the aerostat, for example, by clamping it to a tether line, proves impractical. In such a system, the sensor swings freely about the tether line; for example, a ground controller cannot direct the optics, such as a camera lens, to a desired field of view.

The difficulty suggested in the preceding is not intended to be exhaustive but rather is illustrative of a problem tending to reduce the information gathering capabilities of a sensor mounted to an aerostat platform. Other noteworthy problems may also exist; however, the problem presented above should be sufficient to demonstrate the desirability of a sensor mount apparatus for an optical sensor for use with tethered aerostat platforms.

SUMMARY AND OBJECTS OF THE INVENTION

Accordingly, it is therefore a general object of the invention to provide a sensor mount apparatus which will obviate or minimize difficulties of the type previously described.

It is a specific object of the invention to provide a sensor mount apparatus which enables an optical sensor to see an above-ground, unobstructed, three hundred sixty degree field of view when mounted to a tethered aerostat platform.

It is another object of the invention to provide a sensor mount apparatus which compensates for tension in the tether line and mechanical stresses in the assembly.

It is still another object of the invention to provide a sensor mount apparatus which maintains a sensor in a stable position, even when the center of mass of the sensor moves off a tether axis, to reduce performance degradation; for example, to reduce picture degradation in an optical sensor.

It is a further object of the invention to provide a sensor mount apparatus which maintains torsional stability of the apparatus about a tether axis.

It is yet a further object of the invention to provide a sensor mount apparatus which has acceptable size and weight and is durable.

It is still a further object of the invention to provide a method of assembling a sensor mount apparatus for carrying a sensor and method of using the same to obtain an unobstructed view from an airborne position.

A preferred embodiment of the invention which is intended to accomplish at least some of the foregoing objects includes a sensor mount apparatus having a loop for carrying a sensor payload. The loop has an upper portion and a lower portion. The upper portion of the loop includes at least one upper attachment point for receiving at least one upper tether line. The lower portion of the loop includes at least one lower attachment point to connect the sensor mount apparatus to a lower tether line connected to a surface, such as the ground or the surface of a sea vessel.

The sensor mount apparatus according to the invention further includes an upper plate, a lower plate, and a slide mechanism mounted between the two plates. The upper plate is mounted to the loop. The slide mechanism operates to slidably move the lower plate relative to the upper plate. A sensor payload is affixed to the lower plate. The slide mechanism may slidably move the lower plate and sensor payload to a position where the sensing device of the sensor payload is not obstructed by the loop. Where the sensor payload is an optical sensor, such as a camera, the camera may be positioned to see an unobstructed, three hundred sixty degree field of view.

The sensor mount apparatus is preferably assembled by mounting a first support member to a first side of the loop. A second support member is mounted to a second side of the loop. A top plate is positioned atop the first support member and the second support member. The top plate is attached to the first support member. The top plate is maintained free of attachment to the second side of the loop so that the second side of the loop may move relative to the top plate in response to external forces applied to the loop.

BRIEF DESCRIPTION OF THE DRAWINGS

Other objects and advantages of the present invention will become apparent from the following detailed description of an apparatus according to the invention taken in conjunction with the accompanying drawings, in which.

DETAILED DESCRIPTION OF THE INVENTION

Figure 1:
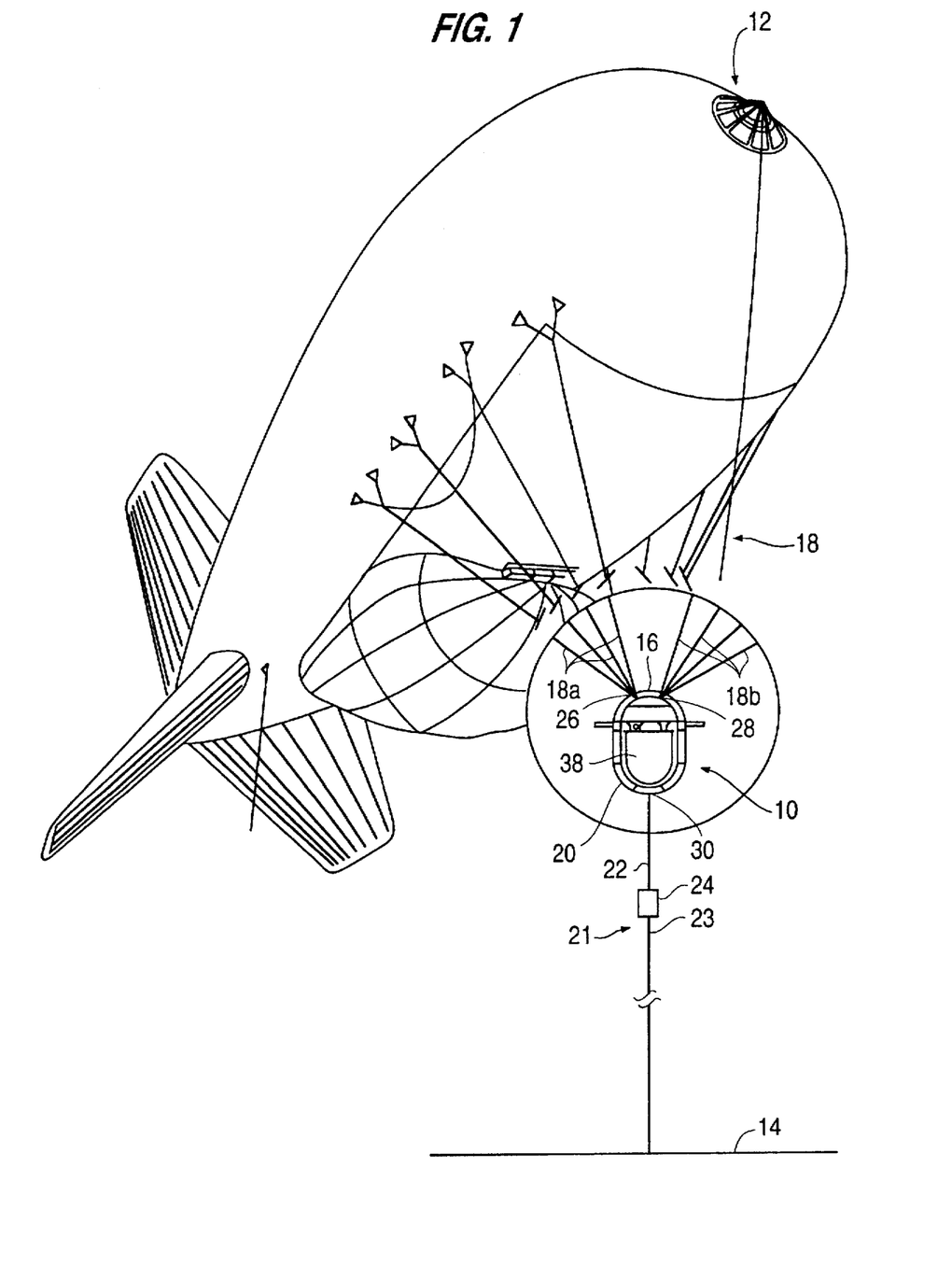
FIG. 1 is a schematic disclosing the context of the subject invention and, in an enlarged portion, depicts a sensor mount apparatus and an optical sensor anchored between rigging lines of an aerostat and a tether line according to the invention.

Referring now to the drawings, wherein like numerals indicate like parts, and initially to FIG. 1, there will be seen a sensor mount apparatus, generally indicated 10, positioned between an aerostat, generally indicated 12, and a surface 14 in accordance with an operative context of the subject invention. Surface 14 may be the ground, or a surface of a fixed or moveable platform such as a ship, a truck, or some other vehicle. Sensor mount apparatus 10 is attached at a top portion 16 to a plurality of upper tether lines, or rigging lines, generally indicated 18. The focal point at which an aerostat's rigging lines converge is referred to as the confluence point. As shown in the enlarged portion of FIG. 1, rigging lines 18 of aerostat 10 converge at two attachment points at top portion 16 of sensor mount apparatus 10. Rigging lines 18a from one side of aerostat 12 converge and attach to a first attachment point 26 of top portion 16. Rigging lines 18b from the other side of aerostat 12 converge and attach to a second attachment point 28 of top portion 16. Shackles or other suitable attachment members may be used to securely attach rigging lines 18a and 18b to first and second attachment points 26 and 28, respectively.

Sensor mount apparatus 10 is attached at a lower portion 20 to a lower tether line, generally indicated 21. Lower tether line includes a first cable 22, such as a torque balanced sling, a second cable 23, and a swivel 24. First cable 22 extends between lower portion 20 and swivel 24, and second cable 23 extends between swivel and surface 14. Lower portion 20 of sensor mount apparatus 10 has a third attachment point 30 to receive first cable 22. Sensor mount apparatus 10, thus, is positioned between aerostat 12 and surface 14 along a tether axis, defined by first and second cables 22 and 23. A shackle or any other suitable attachment member may be used to securely attach first cable 22 to third attachment point 30.

Sensor mount apparatus 10 operably carries a sensor payload 38. One such payload is a sophisticated electro-optical sensor although other sensor payloads may also be used. Sensor mount apparatus 10 provides a stable, above-ground platform for sensor payload 38. From this airborne position, sensor mount apparatus enables manipulation of sensor payload 38 so that sensor payload 38 has an unobstructed, three hundred sixty degree field of view, as will be described in detail below.

The subject sensor mount apparatus 10 may be employed for various military or commercial uses. For example, in a military context, the subject invention may serve as a platform for optical sensors in military surveillance systems, early warning systems, or anti-ballistic missile defense systems, such as infrared search and track (IRST) systems. Commercial uses may include monitoring inclement weather, maritime traffic, or even sporting events. The subject sensor mount apparatus 10 may be used in law enforcement to monitor smuggling, illegal immigration, or drug trafficking. The subject sensor mount apparatus 10 is particularly suited for applications requiring suspension of an optical sensor, or camera, from a high altitude aerostat. However, one of ordinary skill in the art can envision other environments for the subject sensor mount apparatus 10. For example, apparatus 10 may be suspended from a high altitude, stationary platform or from a water vessel to do underwater sensing and surveillance using a variety of instruments, such as radars, meteorological devices or other sensors. This non-exhaustive list suggests a few of the ways the subject sensor mount apparatus 10 may be employed.

Figure 2:
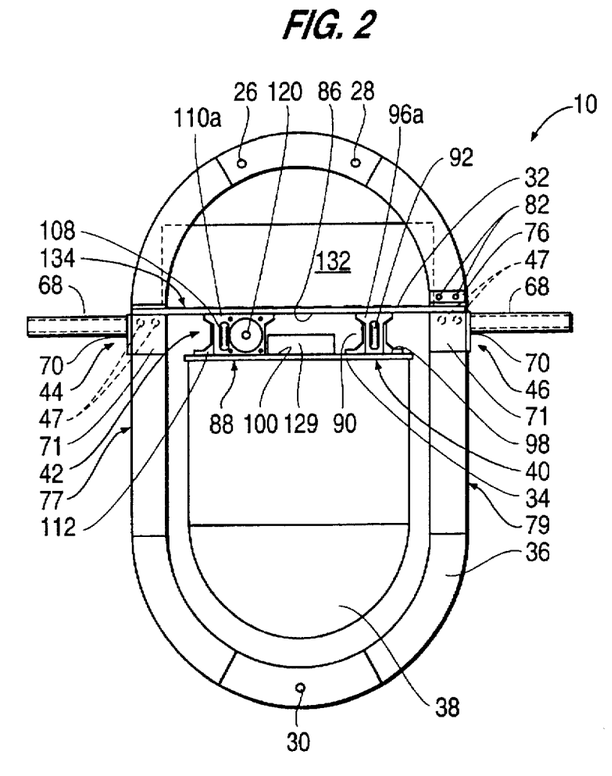
FIG. 2 is a front elevation view of the sensor mount apparatus and an optical sensor in accordance with the invention.

Turning now to FIG. 2, sensor mount apparatus 10 includes an upper plate 32 and a lower plate 34 mounted to a loop 36. A slide mechanism, generally indicated 42, is mounted between upper and lower plates 32 and 34. Lower plate 34 carries a sensor payload 38, such as an optical sensor, on a bottom surface 40. The manner of mounting upper and lower plates 32 and 34 and sensor payload 38 to loop 36 provides at least three distinct structural advantages in accordance with the invention. First, upper plate 32 is mounted to loop 36 so that deflections of loop 36 caused by tension in the tether lines do not induce stresses into upper plate 32. Second, lower plate 34 may move in a horizontal direction relative to loop 36 to move sensor payload 38 off the tether axis. This horizontal movement allows the sensing device of sensor payload 38, such as a camera lens, to pass any obstruction in the field of view caused by loop 36. Third, sensor payload 38 is secured in a stable fashion to sensor mount apparatus 10 by its own weight and inertia, even when the center of mass of sensor payload 38 moves off the tether axis. These advantages will become clearer in the following discussion of the subject invention.

Figure 4:
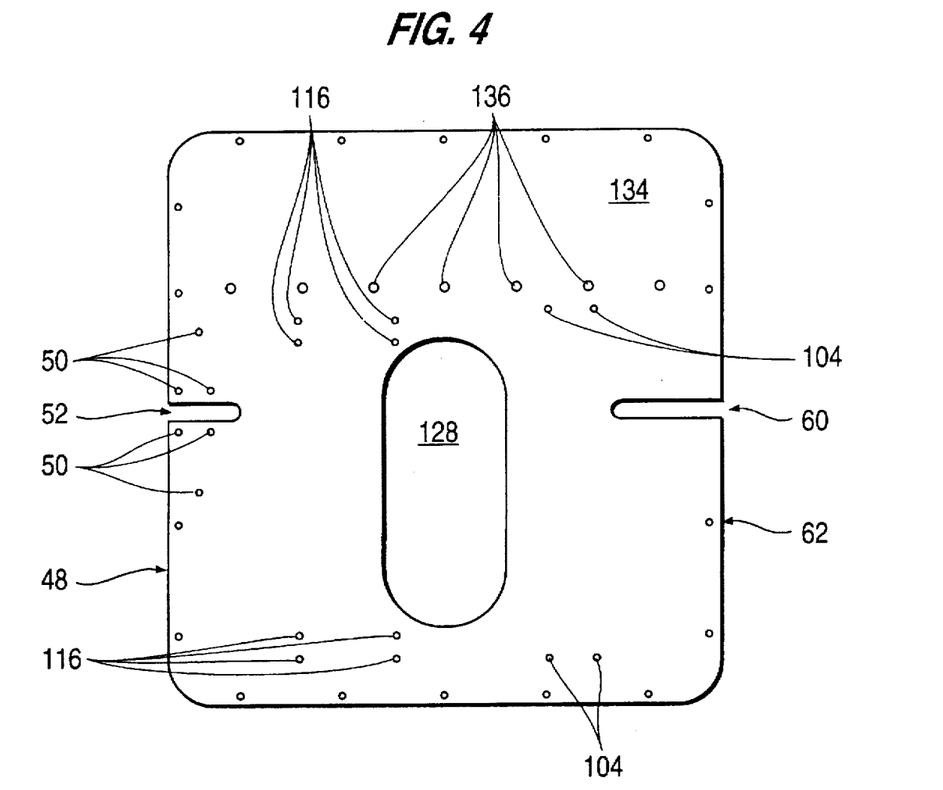
FIG. 4 is a top plan view of the upper plate of the sensor mount apparatus in accordance with the invention.
Figure 5:
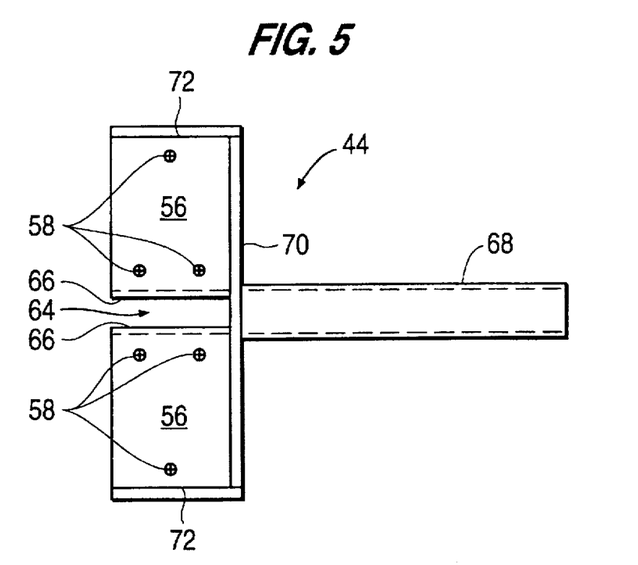
FIG. 5 is a top plan view of a first support member of a handle apparatus in accordance with the invention.

As shown in FIG. 2, upper plate 32 rests on a first support member, generally indicated 44, and a second support member, generally indicated 46, located beneath upper plate 32 on opposite sides of the upper plate 32. First support member 44 is attached in fixed relation to upper plate 32. FIG. 4 shows two patterns of three holes 50 on opposite sides of a slot 52 on a first edge 48 of upper plate 32 as one example of an attachment arrangement. FIG. 5 shows a top portion 56 of first support member 44. Top portion 56 has a series of holes 58 corresponding to holes 50 in upper plate 32. Screws or bolts pass through holes 50 in upper plate 32 and corresponding holes 58 in top portion 56 of first support member 44 to fixedly attach upper plate 32 to first support member 44. According to a preferred embodiment of the present invention, second support member 46 is attached to upper plate 32 in a free mount arrangement for reasons described in more detail below.

FIG. 4 shows that upper plate 32 has a second slot 60 on a second edge 62 of upper plate 32 opposite first slot 52. Slots 52 and 60 in upper plate 32 correspond to slot 64 in first support member 46, as shown in FIG. 5, and a slot in second support member 46 (not shown). Loop 36 slides into slots 52 and 60 in upper plate 32 and through the slots in first and second support members 44 and 46. FIG. 2 shows loop 36 attached to first and second support members 44 and 46 by bolts through holes 47 of each support member 44 and 46 at a location proximate and beneath upper plate 32.

Figure 6:
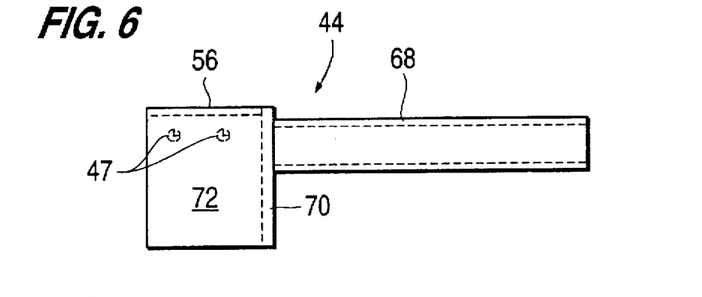
FIG. 6 is a side elevation view of the first support member shown in FIG. 5.
Figure 7:
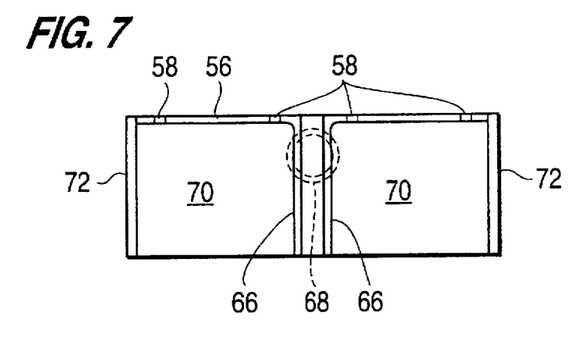
FIG. 7 is a front elevation view of the first support member shown in FIG. 5.
Figure 8:
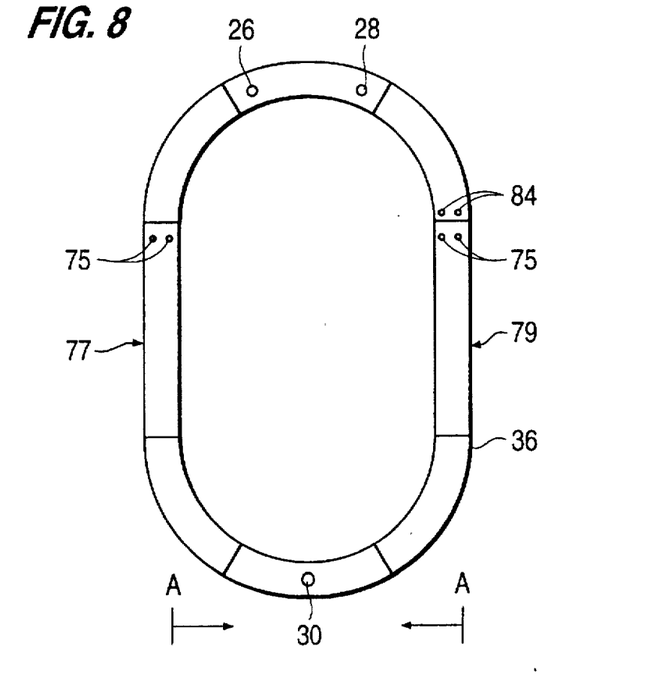
FIG. 8 is a front elevation view of a loop in accordance the invention.

FIGS. 5–7 show first support member 44. Second support member 46 is configured like first support member 44, except that second support member 46 need not have holes 58. If such holes are included in second support member 46, then these holes are simply not used. The following structural description thus applies equally to first and second support members 44 and 46. Each support member 44 and 46 has a handle 68 protruding from a side portion 70. As described above, each support member 44 and 46 also has top portion 56, on which upper plate 32 operably rests. Each support member 44 and 46 also includes opposed end portions 72. Each support member 44 and 46 further has a pair of walls 66 facing each other to form a slot 64. When upper plate 32 is positioned above first and second support members 44 and 46, slots 64 of support members 44 and 46 are aligned. Loop 32 is received by slots 64 in support members 44 and 46 and slots 52 and 60 in upper plate 32. Loop 36 is then bolted or otherwise fastened to both walls 66 of support members 44 and 46 through holes 47 in walls 66, as shown in FIG. 6, and corresponding holes 75 in loop 36, as shown in FIGS. 8.

Figure 9:
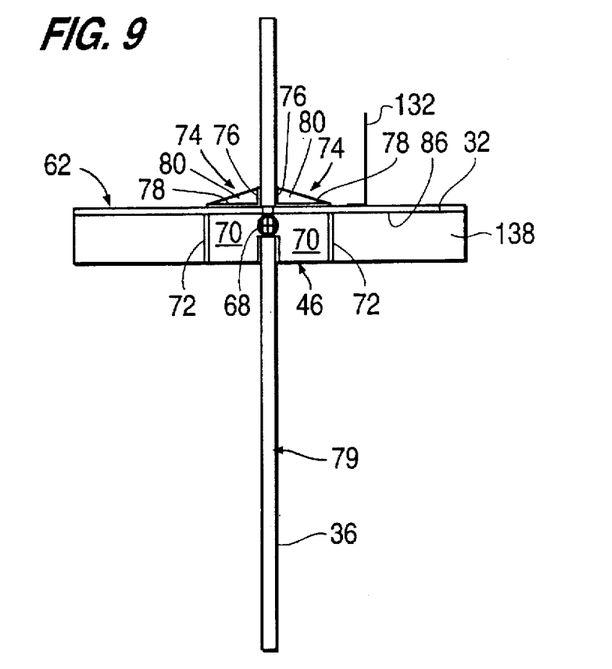
FIG. 9 is a side elevation view of the sensor mount apparatus and shows an upper plate mounted to a loop in a free mount arrangement in accordance with the invention.

Loop 36 has a first side 77 and a second side 79. FIG. 9 shows second edge 62 of upper plate 32 mounted for slidable engagement with second side 79 of loop 36. The free mount arrangement between second support member 46 and upper plate 32 allows loop 36 to move relative to upper plate 32.

Figure 10:
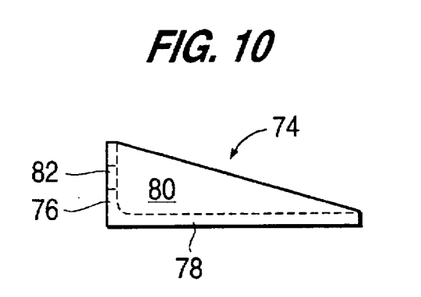
FIG. 10 is a side elevation view of an angle clamp in accordance with the invention.
Figure 11:
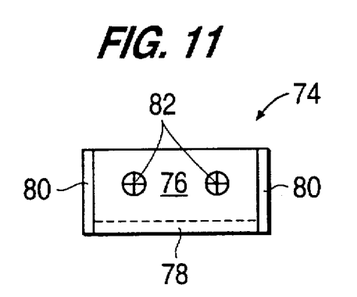
FIG. 11 is an end view of the angle clamp shown in FIG. 10.
Figure 12:
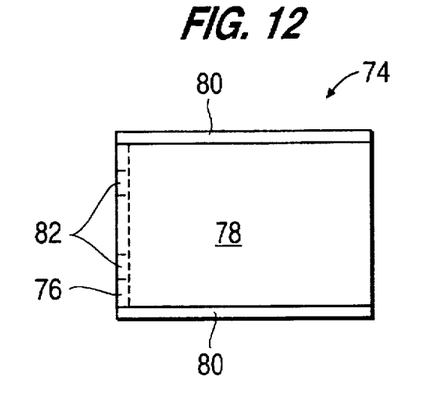
FIG. 12 is a top view of the angle clamp shown in FIG. 10.

FIGS. 10–12 show a preferred embodiment of an angle clamp, generally indicated 74, used in the free mount arrangement. Angle clamp 74 includes a first leg 76, a second leg 78, and opposed walls 80. First leg 76 has a pair of holes 82 for attaching angle clamp 74 to loop 36.

Turning back to FIG. 9, a pair of angle clamps 74 are shown having first leg 76 fastened, for example, by bolts through holes 82 to loop 36 at attachment points 84 of loop 36. FIG. 8 shows the location of these attachment points 84. Second leg 78 of each angle clamp 74 is positioned proximate to upper plate 32. Second leg 78 and top portion 56 of second support member 46 sandwich upper plate 32. Upper plate 32 is not fastened to either angle clamp 74 or second support member 46.

Loop 36 may experience high tension caused by, for example, strong wind pulling aerostat 10 and rigging lines 18 taut. Under high tension, loop 36 may deform. Absent upper plate 32, first side 77 and second side 79 of loop 36 would move inwardly toward the tether axis, in the direction shown by line A—A in FIG. 8. The free mount arrangement between second support member 46 and upper plate 32 allows deformation of loop 36, yet protects against structural damage to upper plate 32. While first side 77 of loop 36 remains fixed relative to upper plate 32, second side 79 of loop 36 may move laterally in slot 60 in response to tension in the tether lines. Second side 79 of loop 36 freely moves inwardly toward and outwardly from the tether axis without transferring stress to upper plate 32.

More specifically, when loop 36 deforms, angle clamps 74 will be displaced relative to their original positions on upper plate 32. However, because angle clamps 74 are not fixed to upper plate 32, but instead are sandwiched between second leg 78 of angle clamp 74 and top portion 56 of second support member 46, there is little, if any, stress transferred to upper plate 32 and thus little, if any, stress-induced deformation of upper plate 32. Eliminating deformation of upper plate 32 is an important feature of the invention. Because a sensor can be mounted directly or indirectly to a bottom surface 86 of upper plate 32, controlling deformation of upper plate 32 is an effective way of reducing sensor error. This maintains the integrity and pointing accuracy of the sensor and reduces degradation in sensor performance.

When a sensor such as an optical sensor is mounted to bottom surface 86 of upper plate 32, loop 36 can obstruct the sensor's field of view. The sensor mount apparatus according to the invention solves this dilemma by providing slide mechanism 42 which operably displaces sensor payload 38 relative to loop 36, thereby avoiding any obstruction loop 36 may create. For example, where sensor payload 38 is a camera and the camera is centrally positioned in loop 38, the camera will "see" the side of loop 36 as the camera lens passes by loop 36. Slide mechanism 42 may slidably move lower plate 34, which carries the camera, along an axis defined by line B—B in FIG. 3 to reposition the camera lens away from obstruction by loop 36.

Figure 13:
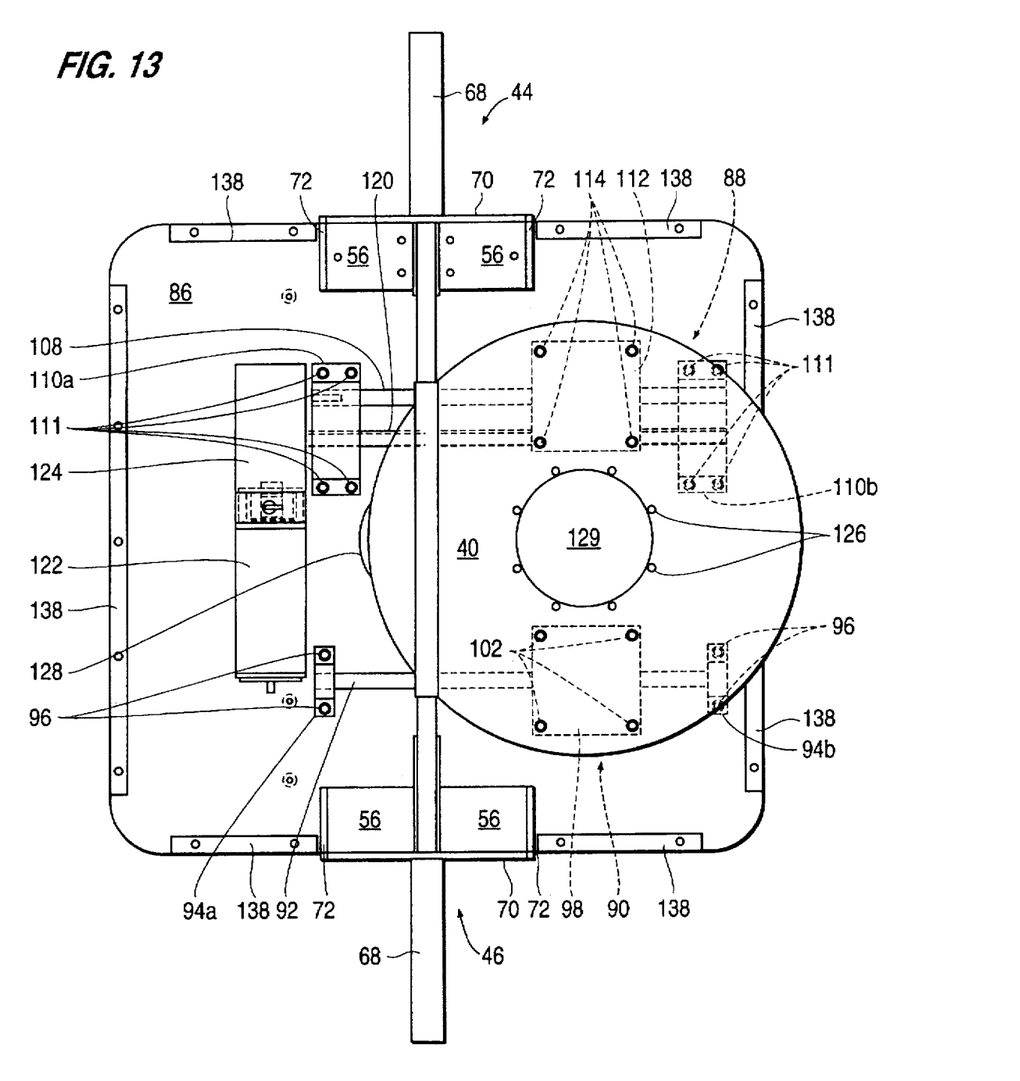
FIG. 13 is a bottom plan view of the sensor mount apparatus in accordance with the invention.

As shown in FIG. 13, a preferred embodiment of slide mechanism 42 includes a powered slide, generally indicated 88, and a slave slide, generally indicated 90. Slave slide 90 has a frame member, or rail, 92 fixedly attached to bottom surface 86 of upper plate 32 by brackets 94a and 94b. Brackets 94a and 94b are fastened to bottom surface 86 with bolts or other fasteners 96. Slave slide 90 also has a slide member 98 fixedly attached to a top surface 100 of lower plate 34 by bolts or other fasteners 102. Upper plate 32 has two sets of two holes 104 for receiving bolts or screws 96 to fasten brackets 94a and 94b to upper plate 32, as shown in FIG. 4. Lower plate 34 has a set of four holes (not shown) for receiving bolts or screws 102 to fasten slide member 98 to lower plate 34.

Figure 3:
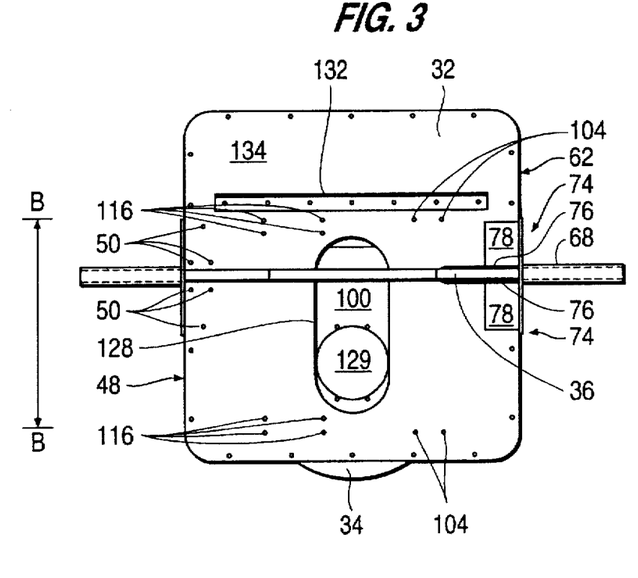
FIG. 3 is a top plan view of the sensor mount apparatus in accordance with the invention.

Slide mechanism 42 also has a powered slide 88. A frame member, or rail, 108 of powered slide 88 is affixed to bottom surface 86 of upper plate 32 by brackets 110a and 110b. Brackets 110a and 110b are fastened to bottom surface 86 by bolts or other fasteners 111. Powered slide 88 also has a slide member 112 fixedly attached to top surface 100 of lower plate 36 by bolts or other fasteners 114. Upper plate 32 has two sets of four holes 116 for receiving bolts or screws 111 to fasten brackets 110a and 110b to upper plate 32, as shown in FIGS. 3 and 4. Lower plate 34 has a set of four holes (not shown) for receiving bolts or screws 114 to fasten slide member 112 to lower plate 34.

Powered slide 88 also has a screw member 120 positioned in spaced, parallel relation to frame member 108. Screw member 120 engages a threaded bore in slide member 112. Screw member 120 is mounted for free rotation within brackets 110a and 110b.

Slide mechanism 42 also includes a motor 122 and an optional gear reduction system, or gearhead, 124 mounted to powered slide 88. Motor 122 and gearhead 124 turn screw member 120. When screw member 120 turns, threads of screw member 120 matingly engage threads of the bore in slide member 112. This translates slide member 112 along frame member 108. Gearhead 124 reduces the speed of motor 122, for example by a ten-to-one ratio, depending on the motor's speed. Slave slide member 98 follows the movement of powered slide member 112. As powered slide member 112 moves along frame member 108, slave slide member 98 moves along frame member 92 at the same rate. Slides 98 and 112 allow lower plate 34 to move from a generally central position beneath upper plate 32, where slide members 98 and 112 abut brackets 94a and 110a, to an extended position, where slide members 98 and 112 abut brackets 94b and 110b. In the extended position, lower plate 34 and sensor payload 38 are displaced a distance away from loop 36. Sensor payload 38 may be positioned at any location between the central position and the extended position so that the sensing device of the sensor payload 38, such as the lens of a camera, is free from obstruction by loop 36. In this manner, the unique structure of slide mechanism 42 allows the sensor in sensor payload 38 to "see" around loop 36.

Sensor mount apparatus 10 may also include an upright bracket 132, as shown in FIG. 2, in accordance with the invention. Upright bracket 132 is fastened to a top surface 134 of upper plate 32 by bolts or screws through holes 136, shown in FIG. 4, in upper plate 32. An electronic control unit (not shown) may be mounted on upright bracket 132 so that an operator may electronically communicate with sensor mount apparatus 10 from the ground. The operator may direct slide mechanism 42 to move lower plate 34 and sensor payload 38 to a position between the central position and the extended position to attain an unobstructed view of a target area. Where sensor payload 38 is a camera, the operator can see the field of view from the ground. If loop 36 obstructs the camera's field of view, the operator can direct movement of slide mechanism 42 to relocate the camera to a position free of obstruction. In one embodiment of the invention, a three lens camera capable of rotation about the vertical and azimuth may be mounted as the sensor payload 38 to lower plate 34. Translation of the camera in a horizontal direction along slides 88 and 90, coupled with the camera's rotation about the vertical and azimuth, enables the operator to position a camera lens at virtually any ground target, free of obstruction by loop 36.

FIG. 13 shows that lower plate 34 has a centrally located bore 129. A stem portion 130 of sensor payload 38 operably extends through bore 129, as seen in FIG. 2. Sensor payload 38 is preferably secured to lower plate 34 by screws or bolts passing through holes 126 in lower plate 34, as shown in FIG. 13, and corresponding holes (not shown) in sensor payload 38. Upper plate 32 has an elongated groove 128. When lower plate 34 is mounted upper plate 32, bore 129 may be seen through elongated groove 128. Elongated groove 128 is formed to receive cables or connectors (not shown) from an electronic control unit mounted to upright bracket 132. These electronic cables and connectors attach to stem portion 130 of sensor payload 38. As lower plate 34 and sensor payload 38 slidably move relative to upper plate 32, the electronic cables and connectors, which are channeled through elongated groove 128, freely move along elongated groove 128 with movement of sensor payload 38. It will be understood that stem portion 130 of sensor payload 38 may extend through or be attached to elongated channel.

In another structural feature of the subject invention, loop 36 is connected to rigging lines 18 and lower tether line 21 in a three-point attachment scheme. The three-point attachment scheme reduces rotation of sensor mount assembly 10 about the tether axis. As shown in FIGS. 2 and 8, loop 36 includes first and second upper attachment points 26 and 28 and third attachment point 30. The placement of the three attachment points minimizes torsional forces applied to sensor payload 38 by aerostat 10 and rigging lines 18 or lower tether line 21. First and second attachment points 26 and 28 are spaced to prevent sensor mount apparatus 10 from oscillating or spinning about the tether axis. To further reduce rotation of sensor mount apparatus 10, lower tether line 21 includes a first cable 22 designed to minimize torsional force applied to lower portion 20 of sensor mount apparatus 10. First cable 22 is preferably a rotation-resistant cable, such as a torque balanced sling. This rotation-resistant cable 22 operates to reduce torsion-induced cable motion between swivel 24 and sensor mount apparatus 10. Moreover, first and second attachment points 26 and 28 react to any small torsional force which passes swivel 24 and rotationresistance cable 22.

Because sensor mount apparatus 10 is airborne, it is preferable to minimize the weight of loop 36. Moreover, reducing the size of loop 36 inherently reduces the instances where loop 36 obstructs the field of view of sensor payload 38. Loop 36 is preferably formed from accurate citea curved beam, rectangular in cross section, and configured in a generally oval shape. As seen in FIG. 2, loop 38 preferably follows the contours and curves of sensor payload 38 to minimize loop weight. It will be understood, however, that loop 36 may be circular, square, or any other shape suitable for carrying upper plate 32, lower plate 34, and sensor payload 38.

As shown in FIG. 9, the cross section of loop 38 may be contoured to reduce additional weight without a concomitant reduction in strength, consistent with the curved beam structural analysis techniques described in *Advanced Mechanics of Materials*, Boresi and Sidebottom, 4th edition, 1985. Specifically, sides 77 and 79 of loop 36 may be thinner in width than the top and bottom portions of loop 36. Loop 36 is preferably composed of aluminum, for example aluminum 7075, to minimize its size and weight.

Like loop 36, upper and lower plates 32 and 34 are preferably composed of aluminum. Upper plate 32 is preferably rectangular in shape, and lower plate 34 is preferably circular in shape. Lower plate 34 may be dimensionally configured to generally correspond to the dimensions of the top surface of an optical sensor mounted to lower plate 34.

Sensor mount apparatus 10 may also include shroud members mounted to bottom surface 86 of upper plate 32. FIG. 9 shows a shroud member 138 mounted to and extending down from bottom surface 86. Shroud member 138 preferably extends down from upper plate 32 a distance sufficient to shroud slide mechanism 42 from view. Shroud member 138 may also serve to shield slide mechanism 42 from the environment. FIG. 13 shows a plurality of shroud members 128 affixed by bolts or other fasteners to the perimeter of bottom surface 86.

A method of assembling sensor mount apparatus 10 in accordance with a preferred embodiment of the invention will now be described. First support member 44 is fastened to a first side 77 of loop 36 by bolts or other fasteners. Second support member 46 is then fastened on a second side 79 of loop 36 by bolts or other fasteners. Upper plate 32 is positioned atop first support member 44 and second support member 46 by sliding upper plate 32 onto loop 36 so that loop 36 passes through grooves 52 and 60 in upper plate 32. Upper plate is fastened by bolts or screws to top portion 56 of first support member 44 through holes 50 in upper plate 32 and holes 58 in first support member 44. Angle clamps 74 are then fastened to second side 79 of loop 36 to maintain upper plate 32 free of fixed attachment to second side 79 of loop 36. Powered slide 88 and slave slide 90 are then mounted to bottom surface 86 of upper plate 32 by fastening brackets 110a and 110b and 96a and 96b to bottom surface 86. Motor 122 and gearhead 124 are mounted to powered slide 88. Lower plate 34, which carries sensor payload 38, is mounted to slide members 112 and 98 of powered slide 88 and slave slide 90.

In describing the invention, reference has been made to a preferred embodiment and illustrative advantages of the invention. Those skilled in the art, however, and familiar with the instant disclosure of the subject invention, will recognize additions, deletions, modifications, substitutions, and other changes which will fall within the purview of the subject invention and claims.

What is claimed is:

1. A sensor mount apparatus comprising:
   a loop having an upper portion and a lower portion, said upper portion including at least one upper attachment point for receiving at least one upper tether line, said lower portion including at least one lower attachment point to connect said sensor mount apparatus to a lower tether line connected to a surface;
   an upper plate mounted to said loop;
   a lower plate in opposed relation to said upper plate;
   a slide mechanism mounted between said upper plate and said lower plate, said slide mechanism operable to slidably move said lower plate relative to said upper plate.

2. A sensor mount apparatus as defined in claim 1, wherein:

said lower plate carries a sensor, and said slide mechanism permits movement of said lower plate relative to said upper plate so that the sensor mounted thereon is moveable to a position free of obstruction by said loop.

3. A sensor mount apparatus as defined in claim 1, wherein:

said at least one upper attachment point includes two upper attachment points.

4. A sensor mount apparatus as defined in claim 1, wherein:

said upper plate includes a first edge and a second edge opposite said first edge, said first edge fixedly mounted to said loop and said second edge slidably engaging said loop to enable lateral movement of said loop relative to said second edge of said upper plate.

5. A sensor mount apparatus as defined in claim 1, wherein:

said upper plate includes a bracket, said bracket being formed to support a control unit for controlling said slide mechanism.

6. A sensor mount apparatus as defined in claim 5, wherein:

said upper plate has an elongated groove formed to receive at least one cable therethrough, said at least one cable connecting said control unit and the sensor.

7. A sensor mount apparatus as defined in claim 1, wherein said slide mechanism comprises:

at least one powered slide mounted to a top surface of said lower plate and to a bottom surface of said upper plate; and a motor for driving said at least one powered slide, said motor being mounted to said at least one powered slide.

8. A sensor mount apparatus as defined in claim 7, wherein said slide mechanism further comprises:

at least one slave slide mounted to a top surface of said lower plate and to a bottom surface of said upper plate, said at least one slave slide mounted in spaced relation from and parallel to said at least one powered slide.

9. An apparatus for supporting a sensor comprising:

a loop, said loop being mounted on opposing sides to a first support member and a second support member, said loop passing through a top plate, said first support member being mounted in fixed relation to said top plate, and said second support member being positioned adjacent to said top plate in a free mount.

10. An apparatus as defined in claim 9 and further comprising:

a first clamp and a second clamp, said first clamp and said second clamp each having a first leg attached to said loop and a second leg, said second leg being positioned to sandwich a top portion of said second support member and said second leg in a free mount, said second leg being mounted for slidable engagement of said top plate.

11. A loop for supporting a sensor package comprising:

an upper portion having at least two points of attachment for attaching rigging lines of an aerostat thereto;

a lower portion having at least one point of attachment for attaching a tether line thereto;

said at least two points of attachment on said upper portion spaced a distance sufficient to prevent rotation of said loop about an axis defined by said tether line.

12. A sensor apparatus for obtaining an unobstructed view comprising:

a sensor mount apparatus;

a sensor mounted to said sensor mount apparatus for movement relative to said sensor mount apparatus to obtain a three hundred sixty degree field of view;

a surface;

at least one cable connecting said sensor mount and the surface; and at least one tether line connecting said sensor mount to an elevated platform.

13. A slide apparatus for permitting movement between a pair of plates positioned in opposed relation comprising:

at least one slide having, a frame member fixedly attached to a first of said pair of plates; and a slide member fixedly attached to a second of said pair of plates, said slide member being slidably mounted to said frame member.

14. A slide apparatus as defined in claim 13, wherein:

said at least one slide is a powered slide; and said slide apparatus further comprises a power source to slidably move said slide member along said frame member so that said second of said pair of plates moves relative to said first of said pair of plates.

15. A slide apparatus as defined in claim 14, wherein said at least one powered slide further comprises:

at least two brackets for fixedly attaching said frame member to said first of said pair of plates.

16. A slide apparatus as defined in claim 15, wherein said at least one powered slide further comprises:

a screw member threadedly connected to said at least two brackets and to said slide member, said screw member being responsive to said power source to move said slide member along said frame member.

17. A slide apparatus as defined in claim 14, wherein said slide apparatus further comprises:

at least one slave slide having, a frame member fixedly attached to a first of said pair of plates in parallel relation to said frame member of said at least one powered slide member, and a slide member fixedly attached to a second of said pair of plates, said slide member slidably mounted to said frame member.

18. A method of mounting an optical sensor at an airborne position to obtain an unobstructed field of view, the method comprising the steps of:

attaching a plurality of rigging lines of an aerostat to a tether line to position the aerostat above ground;

attaching a loop member at an upper portion thereof to the plurality of rigging lines and at a lower portion thereof to the tether line;

mounting a slide mechanism to the loop;

suspending the optical sensor in the loop on the slide mechanism; and translating the optical sensor along the slide mechanism past the loop to avoid obstruction by the loop.

19. A method of mounting an optical sensor assembly at an airborne position to obtain an unobstructed field of view, the method comprising the steps of:

attaching a plurality of rigging lines of an aerostat to a tether line anchored to a surface;

mounting the optical sensor assembly to the tether line at a position where the plurality of rigging lines attach to the tether line; and suspending the optical sensor assembly at a position between the aerostat and the surface.

20. A method of assembling a sensor mount apparatus, said sensor mount apparatus formed for mounting an optical sensor thereto, said method comprising the steps of:

forming a continuous loop;

mounting a first support member to a first side of said continuous loop;

mounting a second support member to a second side of said continuous loop;

positioning a top plate atop said first support member and said second support member;

attaching said top plate to said first support member; and maintaining said top plate free of attachment to said second side of said continuous loop so that said second side of said continuous loop operably moves relative to said top plate in response to external forces on said continuous loop.

* * * * *